No. 744,841. PATENTED NOV. 24, 1903.
A. C. WHITE.
ATTACHABLE VEHICLE RUNNER.
APPLICATION FILED JUNE 27, 1903.
NO MODEL.

Witnesses.

Inventor.
Alvin C. White

No. 744,841. Patented November 24, 1903.

UNITED STATES PATENT OFFICE.

ALVIN C. WHITE, OF MILWAUKEE, WISCONSIN.

ATTACHABLE VEHICLE-RUNNER.

SPECIFICATION forming part of Letters Patent No. 744,841, dated November 24, 1903.

Application filed June 27, 1903. Serial No. 163,327. (No model.)

*To all whom it may concern:*

Be it known that I, ALVIN C. WHITE, residing at Milwaukee, in the county of Milwaukee and State of Wisconsin, have invented a new and useful Improvement in Attachable Vehicle-Runners, of which the following is a description, reference being had to the accompanying drawings, which are a part of this specification.

My invention relates to an improved construction by means of which sled-runners may be detachably placed on the ends of the axles of a wagon-frame to serve in the winter season to support the frame and its load in place of wheels employed with the frame at other times.

My invention consists of the improved runner-attaching means, its parts, and their combinations, as herein described and claimed, or the equivalents thereof.

Figure 1:
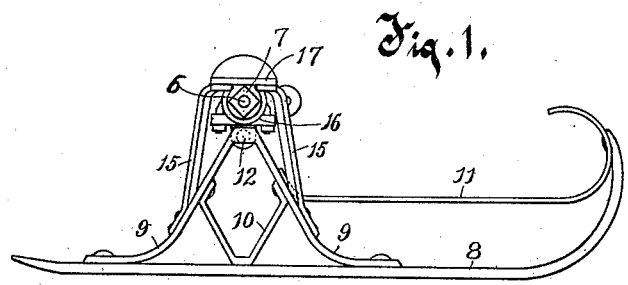
Figure 2:
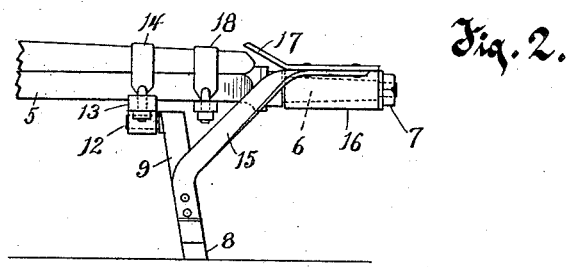
Figure 3:
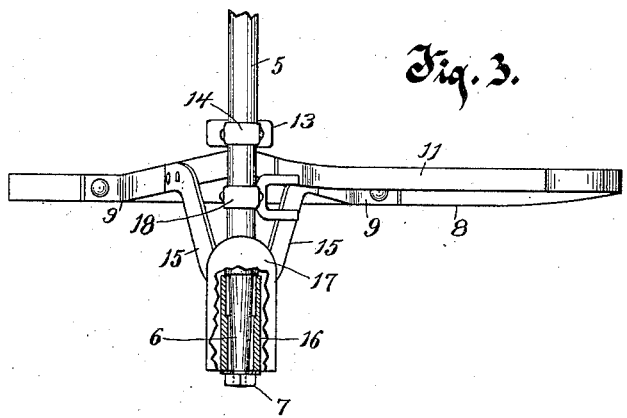

In the drawings, Figure 1 is a side view of a sled-runner attached to an axle of a wagon-frame by my improved means. Fig. 2 is a view at the rear of the same sled-runner and a fragment of the wagon-axle, the runner being attached to the axle by my improved means. Fig. 3 is a top plan view of the same construction shown in Figs. 1 and 2, some of the parts being broken away and others shown in section to exhibit interior construction.

In the drawings, 5 is a fragment of an axle of the usual form employed in wagons or vehicles provided with wheels, this axle terminating at each end with a spindle 6, provided with a wheel-retaining nut 7, all of a form in common use. The axle as thus constructed is intended and adapted for being supported on and carried by wheels on the spindles at each end thereof, like the spindle 6 shown at one end of the axle in the drawings. In those parts of the country where snow falls in the winter it is convenient and desirable to employ sled-runners for supporting the vehicle-frame and on which runners the frame and its load are carried. It is also common to build the sleighs or sleds with runners nearer together than are the wheels on vehicles, thus causing the sleds or sleighs to beat a track in the snow that is narrower than the track on which the wheels of a vehicle as ordinarily constructed travel.

My improved means for attaching runners to a vehicle-frame in the place of wheels provides also for placing the runners nearer together than the wheels on the same frame would be, thus adapting the vehicle when thus supported on runners for use on tracks made by ordinary sleighs or sleds.

My improved means for attaching sled-runners to the frame of a wheeled vehicle in place of the wheels may be employed with individual runners of various forms of construction; but I have shown in the drawings a desirable form of construction for such a sled-runner, in which 8 is the runner proper, this runner being curved upwardly at the front end, and a knee 9 is provided, which may consist of a strap or bar of metal made in furcate form, so that its ends are secured to the runner 8 at a distance apart and extends upwardly medially, being inclined inwardly upwardly, so as to form a forwardly and a rearwardly bracing construction of great strength. This knee may also be reinforced by a furcate brace 10, secured medially to the runner 8 and extending upwardly and outwardly therefrom and its ends being secured to the legs of the knees 9 medially of their height. A rail 11 is secured to the front end of the runner 8 and extends rearwardly therefrom and is secured at its rear end to the knee 9. At its upper end the knee 9 is provided with a horizontally-disposed and inwardly-projecting pin or arbor 12, which fits loosely in the arbor-bearing therefor in a block 13, secured adjustably to the axle 5. Advisably the block 13 is provided in its upper surface with a transverse recess, in which the lower edge of the axle 5 fits, the edge walls of the recess in the block serving as shoulders bearing against the side edges of the axle to prevent the shifting of the block transversely of the axle. The block may be held to the axle adjustably conveniently by means of a clip 14 around the axle, the ends of the clip passing in apertures therefor through the block and being secured thereto by nuts turning on the ends of the clip. The sled-runner has oscillation in the block 13 by reason of the arbor 12 fitting loosely in the block, the extent of the oscillation being limited by the construction hereinafter described. For securing the sled-runner in place detachably to the block 13, and consequently to the axle, and for limiting the forward and backward tilt of the runner I employ other means, as follows: A sleeve-brace, preferably in furcate form, 15 15, is fixed to the knee 9, the furcate form of the brace adapting it to be secured at its ends to the legs of the knee at the front and at the rear and extends upwardly and outwardly therefrom and at its upper and outer end is secured to a sleeve 16, which sleeve fits loosely on the spindle 6 and bears at its inner end against a shoulder of the axle at the inner end of the spindle and is held in place on the spindle releasably by the nut 7, the sleeve being of a suitable length therefor. By this means the sled-runner is held in place detachably on the axle, the arbor 12 being in the block 13, which is properly located by adjustment on the axle therefor; also, as the spindle 6 fits loosely in the sleeve 16 and it is not in the axial line of the arbor 12 the spindle serves as a stop to limit the swing of the sled-runner with reference to the axle forward and back. For connecting the braces 15 15 to the sleeve 6 I preferably employ a construction which includes a plate 17, having the sleeve 16 integral therewith or welded or brazed thereto, so as to be rigid therewith, which plate in the completed construction is located above the sleeve and projects laterally therefrom, and the braces 15 are bolted to the wings or margins of this plate at the respective sides of the sleeve. This plate, which serves as a means for connecting the braces, also serves as a guard and also may be employed in vehicles for passengers as a step.

In the drawings a knuckle-clip 18 is shown on the axle, this being the device commonly employed on front axles of vehicles for attaching a tongue or thills.

What I claim as my invention is—

In combination, a vehicle-axle having a spindle and means for securing a hub on the spindle, an arbor-bearing block on the axle at a distance inwardly from the spindle having a horizontally-disposed arbor-bearing out of line with the axis of the spindle, a sled-runner, a furcate knee having its lower separated and front and rearwardly branching ends secured to the runner and at its upper united end having a horizontally-disposed inwardly-projecting arbor adapted to enter the arbor-bearing by a movement of the runner and knee horizontally inwardly, a furcate knee-brace secured medially to the runner and projecting and spreading apart upwardly and having its upper ends secured to the furcate members of the knee medially, a sleeve fitting removably and oscillatingly on the spindle, and a furcate sleeve-brace secured medially to the top of the sleeve and branching therefrom inwardly and downwardly and having its furcate ends fixed to the furcate members of the knee medially whereby the sleeve is carried on the knee.

In testimony whereof I affix my signature in presence of two witnesses.

ALVIN C. WHITE.

Witnesses:
L. W. RIORDAN,
C. T. BENEDICT.